Patented June 27, 1939

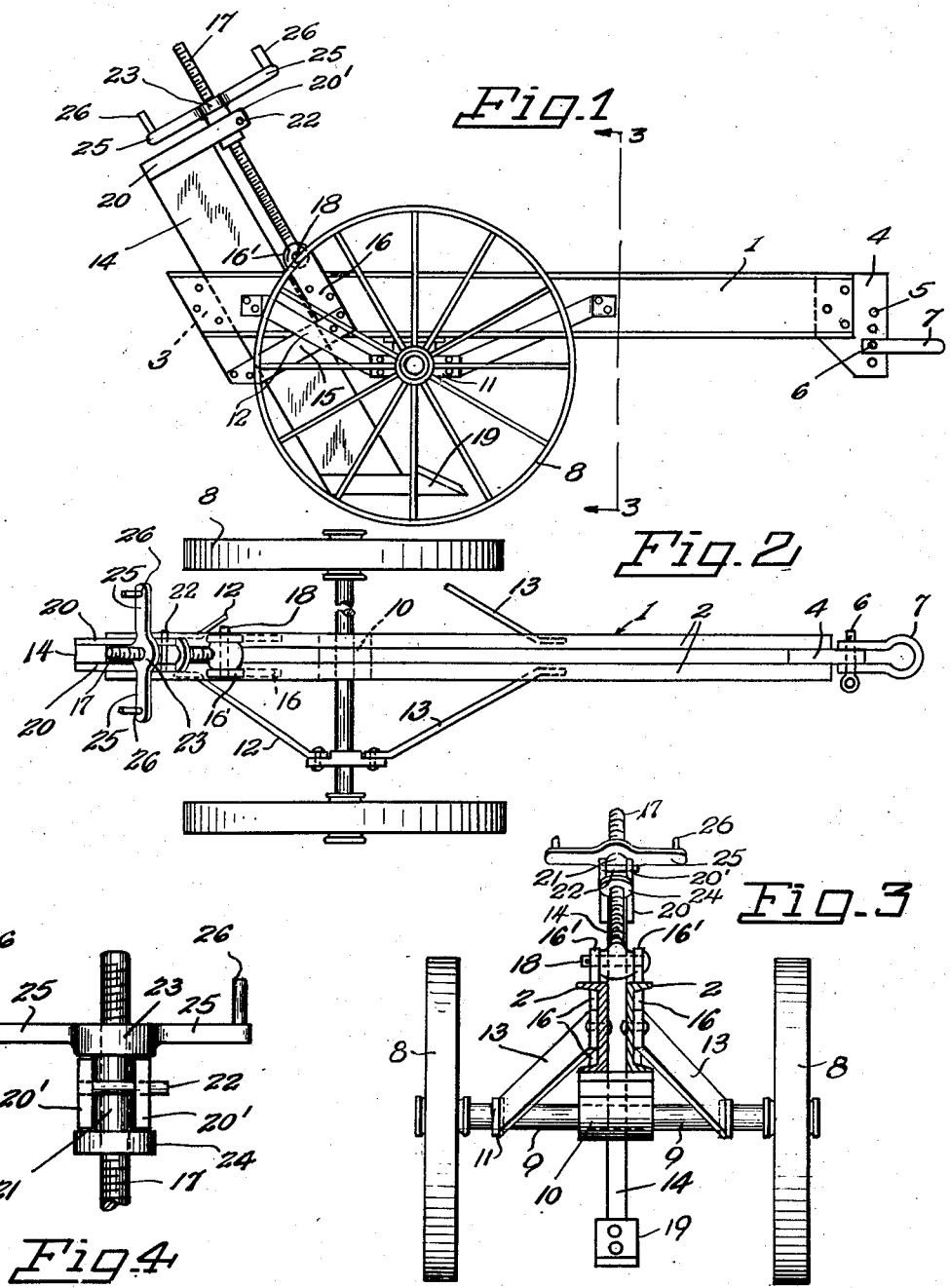

2,163,805

UNITED STATES PATENT OFFICE 2,163,805

SUBSOILER

Lewis E. Pendell, Almira, Wash.

Application December 3, 1937, Serial No. 177,973

3 Claims. (Cl. 97—78)

This invention relates to an agricultural implement known as a subsoiler or subsoil plow, and it is one object of the invention to provide a plow of this character of such construction that ground may be entered to such a depth that the hard pan or crust formed by repeated plowing to the usual depth will be broken up and water permitted to penetrate deeply into the ground. It will thus be seen that during rainy weather water will not be stopped a short distance below the surface of the ground, the soil will be moistened to such a depth that ample moisture will be supplied to growing crops instead of the water being stopped by the hard pan and running off or quickly drying up to such an extent that crops will suffer from lack of moisture during a dry spell which follows a rainy spell.

Another object of the invention is to provide a plow having a shovel-carrying standard which is vertically adjustable to dispose the shovel or plow blade a desired distance below the surface of the ground and thus insure proper breaking up of the hard pan or crust.

Another object of the invention is to provide improved means for adjusting the standard and holding the standard in an adjusted position, the adjusting means being of such construction that it may be very easily operated and will not be liable to accidentally slip after an adjustment has been made.

Another object of the invention is to provide the implement with an improved frame construction including a draft bar of an improved construction and also improved means for rotatably mounting the axle.

The invention is illustrated in the accompanying drawing, wherein

Figure 1 is a side elevation of the improved subsoiler.

Figure 2 is a top plan view of the subsoiler having parts broken away.

Figure 3 is a sectional view taken vertically through the subsoiler along the line 3—3 of Figure 1.

Figure 4 is a fragmentary view looking at the adjusting means for the standard from the front.

This improved subsoiler or subsoil plow has a frame or carriage including in its construction a draft beam formed of companion bars 2 which are of angle metal and have outwardly projecting upper and lower flanges, as shown in Figure 3. Filler blocks 3 and 4 which serve as spacers are secured between the side bars of the draft beam, the front spacer 4 serving as a draft clevis and projecting forwardly from the draft beam with its forward portion formed with a plurality of openings 5 spaced vertically from each other and adapted to receive a pin 6 by means of which a shackle 7 is detachably and adjustably connected with the plate or block 4. The wheels 8 are spaced from opposite sides of the draft beam 1 and mounted upon an axle 9 which extends through a bearing 10 and also through bearings 11 which are held in their proper positions by bracing strips 12 and 13.

A standard 14 extends vertically between rear portions of the side bars 2 of the draft beam 1 and extends downwardly at a forward incline, as shown in Figure 1, with its rear edge face bearing against the front edge face of the rear spacer block 3. Bracing strips 15 extend forwardly from the lower end of the spacer block and at their front ends are secured against lower ends of plates 16 which are secured against opposite sides of the bars 2 and extend upwardly at a rearward incline with their upper ends projecting above the bars and forming ears 16' between which a threaded stem 17 is pivotally mounted by a pin 18. In view of the fact that the standard bears against the spacer 3 and the spacer is braced by the strips 15, the standard will be braced against rearward thrust and prevented from moving out of its proper position when the plow is in use and the shovel 19 at the lower end of the standard is embedded in the ground.

The standard and the shovel carried thereby are to be vertically adjusted so that the shovel will be embedded in the ground a distance greater than the depth of a furrow formed with a plow of the side board construction and thus break up the hard pan of crust which forms after ground has been plowed a number of times. In order to do so, the standard 14 has been provided at its upper end with a cross head consisting of strips 20 secured against opposite side faces of the standard and projecting forwardly therefrom to provide arms 20' between which the stem 17 extends. This stem is threaded through an internally threaded sleeve 21 which is maintained between the arms 20' by a pin 22 and held against vertical shifting movement independent of the standard by the upper and lower collars 23 and 24. Arms 25 extend from opposite sides of the upper collar and carry upstanding handles 26 in order that by grasping the handles and employing the arms 25 as a turning bar, the sleeve may be easily rotated and shifted vertically along the stem. Therefore, the standard which moves with the sleeve will be shifted vertically to adjust the position of the shovel at its lower end and the shovel may be moved from a position above the ground to a position in which it will enter the ground and be embedded therein a depth sufficient to cause it to operate below the hard pan or crust and very effectively break up the hard pan. Therefore, during rainy weather rain water may penetrate the soil and sink deeply into the same instead of being stopped by the hard pan and running off or quickly evaporating after the rain has stopped, and a crop will have ample moisture between rains.

Having thus described the invention, what is claimed as new is:

1. An implement of the character described comprising a carriage including a longitudinally extending draft beam having side bars spaced transversely from each other to provide a passage between the same, a standard extending vertically between the side bars and disposed at a forward incline from its upper end towards its lower end, a shovel at the lower end of said standard, a spacing block between rear end portions of the side bars engaging the rear edge face of said standard to brace the standard against rearward thrust and having its lower portion extending downwardly from the draft beam, bracing strips at opposite sides of said standard extending forwardly at an upward incline from the lower end of said block across the standard and overlapping the outer side faces of the side bars, strips secured against outer side faces of the side bars with front ends of the bracing strips secured against their lower portions and their upper portions projecting upwardly from the side bars and constituting bearing ears, a threaded stem pivoted between the bearing ears and extending upwardly in front of the standard, a cross head for the upper end of said standard consisting of bars secured against side faces of the standard and projecting forwardly therefrom to provide arms, an internally threaded sleeve in threaded engagement with said stem and disposed between said arms, said sleeve having upper and lower collars engaging upper and lower edge faces of the arms to prevent vertical shifting of the sleeve between the arms, a pin extending transversely between the arms in front of said sleeve to hold the sleeve between the arms, and turning arms extending from opposite sides of the upper collar of said sleeve and provided with upstanding handles whereby the sleeve may be rotated and moved along the threaded stem to shift the standard vertically to move the shovel at its lower end into and out of position to enter the ground.

2. In a subsoiler, a carriage including a longitudinally extending beam formed with a vertical passage, a standard extending vertically through said passage and carrying a shovel at its lower end, bearing ears extending upwardly from said beam at opposite sides of the passage, a threaded stem pivoted at its lower end between said ears and extending upwardly in front of the standard, arms extending forwardly from opposite sides of the upper end of the standard and disposed at opposite sides of said stem, a sleeve threaded upon said stem and disposed between said arms and being formed with upper and lower collars for engaging upper and lower edge faces of the arms and causing the arms and standard to be shifted vertically as a unit with the sleeve during adjustment of the sleeve along the stem, a pin passing through said arms in front of said sleeve to maintain the sleeve in place between the arms, and turning arms carried by and extending from opposite side portions of the upper collar and provided with upstanding handles at their ends.

3. In a subsoiler, a carriage including a longitudinally extending draft bar consisting of side beams spaced transversely from each other to provide space between the beams, a spacer block between rear end portions of said beams, a standard extending vertically through space between the beams and held against rearward thrust by engagement with said spacer block, a shovel at the lower end of said standard, strips carried by said beams forwardly of said standard and projecting upwardly therefrom to provide bearing ears, bracing strips extending across opposite sides of said standard below the draft bar and secured at their rear ends to the spacer block and at their front ends to said strips, a threaded stem mounted between said ears and extending upwardly in front of said standard, a sleeve threaded upon said stem, arms extending forwardly from said standard and interengaged with said sleeve to rotatably hold the sleeve between the arms and cause vertical shifting of the standard when the sleeve is rotated and shifted along the stem, and means carried by the sleeve above the arms for turning the sleeve and effecting adjustment thereof along the stem.

LEWIS E. PENDELL.